United States Patent [19]

Shuey et al.

[11] Patent Number: 4,582,726

[45] Date of Patent: Apr. 15, 1986

[54] ADHESIVE SYSTEM FOR USE IN PREPARING MEMBRANE ELEMENTS FOR EXTRACTION SOLVENT RECOVERY PROCESSES

[75] Inventors: Harry F. Shuey, San Dimas; William M. King, Los Alamitos, both of Calif.

[73] Assignee: Exxon Research and Engineering Co., Florham Park, N.J.

[21] Appl. No.: 561,477

[22] Filed: Dec. 14, 1983

[51] Int. Cl.$^4$ .................., ................................ C09J 3/14
[52] U.S. Cl. ................................ 427/208.8; 156/329; 210/321.1; 210/450; 196/14.52
[58] Field of Search ..................... 427/208.8, 409, 410, 427/412.2, 419.8; 210/321.1, 321.5, 321.3, 450; 422/48; 55/158; 156/330, 329, 314, 315; 196/14.52

[56] References Cited

U.S. PATENT DOCUMENTS 3,386,583  6/1968  Merten ............................. 210/321.1

OTHER PUBLICATIONS

*General Electric Catalogue S-2F*, "RTV Silicone Rubber Adhesive/Sealants for Industrial Applications", 1979.
*General Electric Catalogue S-35B*, "Two Component RTV Silicone Rubber Compounds for Industrial Applications".
*General Electric Catalogue S-2G*, "The Sealers-RTV Silicone Rubber Adhesive/Sealants for Industrial Applications".
*General Electric Catalogue RTV-31, RTV-60, RTV-88* Silicone Rubber Compounds.
General Electric Technical Information Sheet TSR-1741.
General Electric Technical Data Sheet–Curing Agents for GE RTV Silicone Rubber Compounds.
*General Electric Brochure* SS 4004, SS 4044, SS 4120 and SS 4155–Silicone Primers for Use with Two Component RTV Silicone Rubber Compounds.
Dow Corning Brochures, "Information About Silicone Elastomers", 3140 RTV Coating.
Dow Corning Brochures, 61-194, 63-002B, "Silicone-Key Characteristics".
*Dow Corning*, "Silane Coupling Agents".
*Union Carbide Catalogue*, "Silicone-Organofunctional Silanes-A Profile", 1981.
Material Safety Data Sheets for: GE-RTV-11, GE-RTV-21, GE-RTV-31, GE-RTV-60, GE-RTV-106, GE-RTV-108, GE-RTV-116, GE-RTV-159, GE-RTV-161, GE-RTV-162, GE-RTV-615A, GE-RTV-615B, GE-RTV-9811, GE SS-4004, GE SS-4044, GE SS-4120, GE-SS-4155, GE-SS-4179.
Material Safety Data Sheets for: Union Carbide A-143, Union Carbide A-186.
Material Safety Data Sheets for: Dow Corning 1200, Dow Corning 1201, Dow Corning 1204, Dow Corning 1205, Dow Corning 730, Dow Corning 732, Dow Corning 734, Dow Corning 738, Dow Corning 3110, Dow Corning 3120, Dow Corning 3140, Dow Corning 3245, Dow Corning Sylgard 182 and 182 Curing Agent, Dow Corning Sylgard 184 and 184 Curing Agent, Dow Corning 3112, Dow Corning 736.

*Primary Examiner*—John D. Smith
*Assistant Examiner*—Ken Jaconetty
*Attorney, Agent, or Firm*—Joseph J. Allocca

[57] ABSTRACT

In fabricating membrane elements, and especially spiral wound membrane elements, for the separation of extraction solvents, especially N-methyl-2-pyrrolidone (NMP) from extracted oil fractions (e.g., extract of raffinate), adhesive systems consisting of specific silicone elastomers in combination with specific primers have been identified which are useful in forming the bonds necessary to produce an element, as for example, in forming the edge-seal bonds of the membrane that is used to effect the separation, in bonding the membrane leaves to the metal or plastic components of the element, and in forming a protective outer-wrap for the element.

33 Claims, No Drawings

ADHESIVE SYSTEM FOR USE IN PREPARING MEMBRANE ELEMENTS FOR EXTRACTION SOLVENT RECOVERY PROCESSES

In fabricating membrane elements, and especially spiral wound membrane elements, for the separation of extraction solvents, especially N-methyl-2-pyrrolidone (NMP) from extracted oil fractions (e.g., extract of raffinate), adhesive systems consisting of specific silicone elastomers in combination with specific primers have been identified which are useful in forming the bonds necessary to produce an element, as for example, in forming the edge-seal bonds of the membrane that is used to effect the separation, in bonding the membrane leaves to the metal or plastic components of the element, and in forming a protective outer-wrap for the element.

Membrane elements useful for performing this separation of extraction solvents, especially NMP from extract or raffinate streams generated in NMP extraction processes are fabricated using regenerated cellulose as the membrane separation material. The use of regenerated cellulose as the membrane material for the separation of extraction solvents and especially NMP from extract and/or raffinate streams is disclosed and claimed in U.S. Pat. No. 4,510,047, "Selective Extraction Solvent Recovery Using Regenerated Cellulose Membrane Under Reverse Osmosis Conditions", filed even date herewith in the name of John A. Thompson. Examples of membrane elements use for this purpose are plate and frame elements, and spiral-wound elements. The configuration and relationship of the various components used to produce spiral wound membrane elements are generally described in U.S. Pat. Nos. 3,417,870, 3,173,867, 3,367,504, 3,386,583, and 3,397,790, to list just a few.

Fabrication of such elements, and especially the spiral wound elements, in addition to using the aforementioned regenerated cellulose, employs exit and delivery tubes (e.g., permeate tubes), permeate spacer material, retentate spacer material, and various seals and gaskets. In separating NMP from extract or raffinate streams, all of these various components must be resistant to NMP. Also, to establish well defined and independent permeate and retentate channels, an adhesive must be employed to form edge-seals between layers of membrane surrounding the permeate spacer materials, as well as to form bonds between the membrane leaves and various surfaces of the element. To this end, various silicone adhesive systems have been identified which are resistant to NMP and form strong NMP resistant bonds between and to the various materials used in element fabrication.

Silicone adhesives are room-temperature vulcanizing silicone commonly known as RTV's. They are divided into broad categories; single-component and two-component RTV silicone adhesives.

The single-component silicone adhesives do not require a catalyst and generally react with moisture in the air, evolving either acetic acid (acetoxy) or alcohol (alkoxy) during their cure. The acetic acid or alcohol odor disappears as the cure process progresses. In general, thin sections up to 6 mm thick will cure through in 24 hours at room temperature. Longer cures of up to 14 days are required to develop full bond strength. For sections greater than 6 mm in thickness, two-component RTV silicone adhesive systems are recommended. One of the prerequisites for any adhesive system is a sufficiently long pot life. With the single-component silicone adhesives this is achieved by control of the atmosphere which facilitates curing, e.g., moisture control. For two-component systems, pot life is regulated by the amount of catalyst that is added.

In this specification and following claims, numerous adhesives, catalysts and primers produced by various manufacturers, such as General Electric and Dow Corning, are identified. Those materials, identified by specific product code designations, are trademark-bearing products of the respective companies.

The two-component RTV silicone adhesives fall into two categories based on the manner in which they cure. One type undergoes a condensation reaction during its cure cycle and evolves small amounts of a volatile by-product. The other type cures via an addition reaction and nothing is evolved. Both types require a catalyst. The preferred silicone adhesive system in this invention is General Electric (GE) 31, which is a red polysiloxane two-component type adhesive which requires a catalyst and undergoes a condensation-type cure. Dibutyl tin dilaurate (DBT), a liquid catalyst, or GE RTV 9811 paste catalyst are preferred for this adhesive. When used in a concentration of 0.10%, DBT provides an adequate pot life (up to two hours for the fabrication of spiral-wound membrane elements that are eight inches in diameter. For smaller elements, e.g., four inches in diameter, where a pot life of 40 minutes or less is acceptable GE RTV 9811 paste catalyst may be used. Another catalyst, stannous tin octoate, in concentration up to 0.50% by weight, may also be used where pot life of one hour or less is satisfactory. In fabricating four-inch diameter elements, with GE 31 an adequate pot life is achieved by using 19 parts of adhesive to one part RTV 9811. This gives a pot life of about 40 minutes before the viscosity becomes unworkable. Ratios higher than 19/1 adhesive/RTV 9811 should be avoided since bond strength may be adversely affected.

For this invention, it is not sufficient to merely identify silicone adhesives which are resistant to NMP. For the adhesive to be truly functional it must form a long-lived bond between the various materials which bond is resistant to NMP streams as would be encountered in actual separation environments. To this end, a series of primers have been identified which facilitate a strong NMP-resistant bond between select silicone adhesives and the element components to be bonded, and various specific silicone adhesive-primer combinations have been identified as useful for fabricating spiral-wound elements for service in NMP.

Membrane edge-seal bonds resistant to NMP/oil solutions at about 120° C. are formed by employing the following specific silicone adhesive-primer combinations: General Electric (GE) 106 adhesive+Dow Corning (DC) Z-6040 primer; GE 116 adhesive+DC Z-6040 primer; GE 108 adhesive+DC Z-6040 primer; GE 31 adhesive+GE 9811 paste catalyst+DC 1200 (red) primer; GE 31 adhesive+GE 9811 paste catalyst+GE SS-4004 primer; GE 31 adhesive+GE 9811 paste catalyst+GE SS-4155 primer; GE 31 adhesive+GE 9811 paste catalyst+GE SS-4044 primer; GE 31 adhesive+9811 paste catalyst+GE SS-4044 primer (diluted with isopropanol); GE 31 adhesive+dibutyl tin dilaurate (DBT) liquid catalyst+GE SS-4044 primer; GE 31 adhesive+DBT liquid catalyst+GE SS-4044 primer (diluted with isopropanol); DC 3140 adhesive+DC Z-6040 primer (diluted with acetone); DC 3140 adhesive+DC Z-6040 primer (diluted with methanol) and DC 3140 adhesive+GE SS-4120 primer.

The preferred edge-seal adhesive and primer system is GE 31 silicone adhesive (with either GE 9811 or DBT catalyst)+GE SS-4044 (diluted with isopropanol) primer. The GE 106, GE 108 and GE 116 silicone adhesive systems are moisture sensitive and evolve acetic acid during curing. When employing the acetic acid-evolving adhesives, adequate ventilation must be used and the humidity must be controlled to insure a workable, useful pot life.

In fabricating spiral wound regenerated cellulose membrane elements various NMP-resistant components are employed, such as a metal (e.g., steel) permeate tube, Vexar retentate spacer material (available from Amoco Fabrics, Vexar Style 5305-040-07-0700), simplex permeate spacer material (available from Hornwood Incorporated, Hornwood Style 8415), a U-cup carrier and anti-telescoping device of plastic or metal (nylon or aluminum), tapes and windings, seals and gaskets and an adhesive/primer system.

In forming a bond between element components (e.g. the regenerated cellulose membrane leaf) and the steel permeate tube, the tube is, as a matter of good practice, sandblasted, degreased, washed in acetone and dried. The silicone adhesive-primer system employed to form the bond is selected from the following specific combinations: Dow Corning (DC) 3140 adhesive+DC 1200 (clear) primer; DC 3140 adhesive+DC 1200 (red) primer; DC 3140 adhesive+DC Sylgard primer; DC 3140 adhesive+GE SS 4004 primer; DC 3140 adhesive+GE SS 4155 primer; DC 3140 adhesive+GE SS 4044 primer; GE 31 adhesive+GE 9811 paste catalyst+GE SS 4044 primer; GE 31 adhesive+GE 9811 paste catalyst+GE SS 4044 primer (diluted with Isopropanol); GE 31 adhesive+DBT liquid catalyst+GE SS 4044 primer; GE 31 adhesive+DBT liquid catalyst+GE SS 4044 primer (diluted with isopropanol); GE 31 adhesive+GE 9811 paste catalyst+DC 1200 (clear) primer; GE 31 adhesive+GE 9811 paste catalyst+GE SS 4004 primer and GE 31 adhesive+GE 9811 paste catalyst+DC 1200 (red) primer. The preferred silicone adhesive-primer system for bonding to the permeate tubes is GE 31 adhesive with either GE 9811 or DBT catalyst with GE SS 4044 primer.

In forming the outer-wrap around the element and in bonding to the U-cup carrier and anti-telescope device (the end pieces), the preferred adhesive-primer system is GE 31 adhesive with either DBT or GE 9811 catalyst and GE SS 4044 primer. Prior to applying the outer-wrap adhesive, a woven-glass tape is wrapped around the element body to contain the spiral-wound membrane leaves, and to provide reinforcement and strength to the outer-wrap. The woven-glass tape is primed with GE SS 4044 (1 part primer in 3 parts isopropanol) and allowed to dry prior to applying the adhesive.

Beyond the proper selection of adhesive and primer to form an NMP/oil-resistant bond between and/or to the materials employed in element fabrication, it has also been determined that for some of the primers to function properly they should be diluted with solvent. This provides more uniform wetting of the substrate. Primer diluents should be selected from those solvents employed as solvents in the production of the primer by the manufacturer. In the preferred adhesive-primer system of GE 31 adhesive+DBT or GE 9811 catalyst and GE SS 4044 primer, the primer is diluted with up to 4 volumes of isopropanol. Dilution with up to 3 volumes of isopropanol is preferred.

These primers are best applied to the surface by wiping; excess primer should be avoided so as not to encounter uncontrolled running of the primer across the surface of the membrane. Best results are obtained if the primer, once applied, is allowed to dry before application of the silicone adhesive when used to form membrane edge seals or membrane to permeate tube seals. Primed surfaces which are not fully dried can cause cure inhibition of some silicone adhesive systems. As a matter of good practice it is therefore preferred that all primed surfaces be permitted to dry before application of the adhesive. This assures strong, uniform bonds.

In winding spiral wound elements care should be taken to avoid the formation of membrane edge wrinkles and pinholes in the membrane material. Pinholes are best avoided by careful examination of the permeate spacer material and removal of projecting particles. Wrinkled membrane edges (along the sealed edge) are avoided by careful handling of the membrane leaves and by avoiding conditions of high humidity during leaf preparation.

One of the prerequisites for any adhesive system is a sufficiently long pot life. In employing silicone adhesives this is achieved, in the single component case silicones, by control of the atmosphere which facilitates curing, e.g., moisture control, while in two component silicone adhesives control of the ratio of adhesive to catalyst is an effective control of cure time and pot life. For the preferred GE 31+GE 9811+GE 4044 system, when used in the production of a spiral wound membrane element, the pot life of the adhesive is lengthened by increasing the ratio of adhesive to catalyst. A ratio of about 19/1 adhesive/catalyst gives a pot life of about 40 minutes before the viscosity becomes unworkable. Levels beyond about 19/1 should be avoided since bond strength may be adversely affected.

EXAMPLES

EXAMPLE 1

A number of single component and two component silicone adhesive systems were evaluated by forming coupons consisting of an adhesive filled layer of resin-impregnated simplex cloth sandwiched in between two pieces of PM 250 regenerated cellulose membrane. (PM 250 regenerated cellulose membrane is available from ENKA A.G. and has a molecular weight cut-off of about 10 to $12 \times 10^3$ and a thickness of about $17.5\mu$. The test coupons were cured for 21 days at room temperature and then tested in hot NMP for 7 days at 120°-160° C. The results of the evaluation are shown below:

TABLE 1

| Cure Type | Dow Corning | Bond Quality | General Electric | Bond Quality |
|---|---|---|---|---|
| Acetoxy | 730(1) | N/A | RTV 108(1) | Good |
| Acetoxy | 732(1) | Good | RTV 159(1) | Poor |
| Acetoxy | 734(1) | Good | | |
| Alkoxy | 3145(1) | Poor | RTV 162(1) | Poor. |
| Alkoxy | | | RTV 1573(1) | Poor |
| Condensation | 3110(2) | Poor | RTV 11(2) | Poor |
| Condensation | | | RTV 60(2) | Poor |
| Addition | | | RTV 615(2) | Poor |

*A fluorosilicone - disintegrated in hot NMP
(1)one component
(2)two component

None of the alkoxy condensation or addition compounds gave satisfactory bonds to the regenerated cellulose membrane. The acetoxy silicone adhesives gave good bonds to the regenerated cellulose. The adhesives per se were not affected by the hot NMP, but the adhesive bonds were weakened.

EXAMPLE 2

Four acetoxy-curing RTV adhesives were evaluated for bond quality in 120° C. NMP. Regenerated cellulose/simplex coupons as described in Example 1 were employed as test specimens. One coupon of each adhesive was prepared whereby the regenerated cellulose was given an acetic acid wipe. The excess acid was allowed to evaporate prior to applying the adhesive. This was done on the speculation that the evolution of acetic acid during cure had contributed to improved bonding in Example 1. The adhesives evaluated were GE 108, GE 106, DC 732 and DC 734. Coupons were cured for 2, 3 and 6 weeks at room temperature, as well as for 24 hours at 40° C.

All 4 adhesives gave good dry bonds with PM 250 regenerated cellulose. None of the adhesive coupons, however, had good bonds at the end of one week in NMP at 120° C. Acetic acid wiping did not improve bond quality. This is to be compared with the results of Example 1.

EXAMPLE 3

GE 106, GE 108 and DC 734, while showing resistance to hot NMP, do not form NMP-resistant adhesive bonds to regenerated cellulose. To overcome this reluctance to form NMP-resistant bonds, various organo silanes were employed to prime the regenerated cellulose. The materials employed were:

Z 1224 Trimethylchlorosilane
Z 6020 N-(2-aminoethyl)-3-aminopropyltrimethoxysilane
Z 6040 γ-glycidoxypropyltrimethoxysilane
Z 6062 Mercaptopropyltrimethoxysilane All of the above are from Dow Corning. They were used as 0.5% solutions in acetone (hexane was used for Z 1224). The primers were wiped onto the regenerated cellulose membrane and allowed to dry at 60° C. for 15 minutes prior to coupon fabrication (see Example 1). The fabricated coupons were cured overnight at 60° C. and then immersed in both hot NMP and hot NMP/oil (20% 600N oil). Only those coupons employing GE 106 and GE 108 in combination with Z 6040 (an epoxy silane) demonstrated the formation of NMP resistant bonds.

EXAMPLE 4

Various concentrations of Z 6040 were next evaluated. Z 6040 in acetone at 0.25, 0.75 and 1.0% concentration levels in acetone were tested as primers for the regenerated cellulose, as were room temperature primer drying times of 1 minute, 5 minutes, 15 minutes, 30 minutes, 1 hour, 6 hours, and 24 hours. A control of 15 minutes oven dry at 60° C. was also used. Coupons were evaluated in both NMP/oil (120° C.) (Table 2) and in NMP (120° C.) (Table 3). The effect of varying the concentration and dry time of the epoxy silane on bond durability in the hot NMP test solvent is presented below.

TABLE 2

Effect of Epoxysilane Application Conditions on Bond Strength after 2 weeks in 20% 600 N Oil/NMP at 120° C.
DRYING TIME OF Z-6040 WIPE PRIOR TO APPLYING SILICONE ADHESIVE

| Z-6040 (%) | Adhes. | Control (a) | 1 Min | 5 Min | 15 Min | 30 Min | 1 Hr | 6 Hrs | 1 Day |
|---|---|---|---|---|---|---|---|---|---|
| 0.25 | 106 | 5(b) | 5 | 4 | 5 | 4 | 5 | 5 | 5 |
|  | 108 | 5 | 5 | 4 | 5 | 3 | 3 | 5 | 5 |
| 0.50 | 106 | 5 | 5 | 5 | 5 | 4 | 4 | — | — |
|  | 108 | 4 | 5 | 2 | 4 | 5 | 2 | 5 | 4 |
| 0.75 | 106 | 5 | 4 | 5 | 5 | 5 | 0 | — | 5 |
|  | 108 | 5 | 4 | 5 | 5 | — | 4 | — | 5 |
| 1.00 | 106 | 5 | 5 | 5 | 5 | 4 | 4 | 5 | 5 |
|  | 108 | 5 | 5 | 4 | 5 | 4 | 5 | 5 | 5 |

Note:
(a)Silane wipe dried 15 minutes @ 60° C.; all adhesive coupons cured 24 hours at 60° C.
(b)Bond strength on a scale of 0 to 5; 0 = Failure, 5 = Strong Bond.

TABLE 3

Effect of Epoxysilane Application Conditions on Bond Durability Bond Strength After Two Weeks in NMP at 120° C.
DRYING TIME OF Z6040 WIPE PRIOR TO APPLYING SILICONE ADHESIVE

| Z6040 (%) | Adhes. | Control (a) | 1 Min | 5 Min | 5 Min | 30 Min | 1 Hr | 6 Hrs | 1 Day |
|---|---|---|---|---|---|---|---|---|---|
| 0.25 | 106 | 5(b) | 1 | 1 | 1 | 1 | 0 | 1 | 1 |
|  | 108 | 5 | 2 | 0 | 2 | 1 | 0 | 5 | 1 |
| 0.50 | 106 | 2 | 1 | 3 | 0 | 3 | 1 | 3 | 3 |
|  | 108 | 1 | 1 | 1 | 1 | 1 | 0 | 3 | 3 |
| 0.75 | 106 | 1 | — | 1 | 3 | 0 | 0 | 1 | 1 |
|  | 108 | 5 | 1 | 2 | 1 | 1 | 1 | 1 | 2 |
| 1.00 | 106 | 5 | 5 | 4 | 5 | 1 | 1 | 1 | 1 |
|  | 108 | 1 | 5 | 1 | 1 | 1 | 0 | 5 | 4 |

Note:
(a)Silane wipe dried 15 minutes @ 60° C.; all adhesive coupons cured 24 hours at 60° C.
(b)Bond strength based on a scale of 0 to 5; 0 = Failure, 5 = Strong Bond.

EXAMPLE 5

Silicones available from Dow Corning as DC-3110 and DC-3120 were evaluated for bond formation to spiral-wound element end-pieces (U-cup carrier and anti-telescoping devices) that were fabricated from Nylon 6. Specimens of nylon were primed by wiping the surface with Z-6040 primer and with substances which are known to be solvents (etching) for nylon. When the primed or etched surfaces were dry, the adhesives were applied, allowed to cure, and the adhesive bond to the nylon was evaluated. The results are presented below:

TABLE 4

EFFECT OF NYLON END-CAP PRETREATMENT ON ADHESIVE BOND QUALITY

| Pretreatment | Bond* |
|---|---|
| None | None |
| Detergent wash, acetone rinse, oven dry | None |
| Abrasion with sandpaper and repeat above | None |
| Phenol wipe, 5 min dry | None |
| Formic acid (conc.) wipe, 5 min dry | None |
| HCl wipe, H$_2$O rinse, acetone rinse, oven dry | None |
| 0.50% Z6040 in acetone, wipe, 5 min dry | None |
| Same as above, oven dry | None |
| 0.50% Z6062 in acetone, wipe, 5 min dry | None |
| Z-6040 (epoxysilane, full strength), 10 min dry | None |
| Z-6040 (epoxysilane, full strength), 30 min dry | None |
| Z-6040 (epoxysilane, full strength), 18 hrs at 60° C. | None |

*Adhesives (DC-3110, DC-3120) were applied after the pretreatment and cured 24 hours at 60° C. prior to evaluation of the bond.

EXAMPLE 6

GE106 and GE108 were also evaluated for the ability to bond to Nylon 6. Two untreated samples of nylon were coated with the two silicones respectively. It was seen that a bond formed when thick coatings (¼ inch) were used, but no bond formed when thin coatings were applied. The bonds were not evaluated for resistance to NMP or NMP/oil.

EXAMPLE 7

A number of silicone elastomers were evaluated for bond formation to Nylon 6. DC-734 (clear and white) formed a strong bond nylon. GE-11 and GE-31 cured within 2 hours, but did not form a bond to the nylon. GE-615 and DC-184 did not cure, and as shown in Example 5 DC-3110 and DC-3120 did not bond to nylon. Although DC-734 bonded to nylon initially, the bond failed in hot NMP and hot NMP-oil. Wiping the nylon with acetic acid merely weakened the initial bond.

EXAMPLE 8

An attempt was made to fabricate a spiral wound element with PM250 (Enka) regenerated cellulose using GE-106 as the edge seal and DC-734 as the nylon bond/outer wrap resin. Since the DC-734 does not bond to Nylon 6 a series of holes was drilled in the Nylon to form mechanical anchor points. The GE 106 was used in combination with the Z-6040 primer (1.5% solution of the epoxy silane primer in acetone).

During fabrication it was discovered that the GE-106 silicone elastomers possessed a short pot life. The viscosity of the resin increased too rapidly to permit penetration of the permeate spacer material at the edges thereby preventing the formation of a good edge seal bond.

Thus, it is seen that long pot life is an essential prerequisite of any adhesive used to form edge seal bonds.

EXAMPLE 9

Another attempt was made to fabricate a spiral-wound element using PM250 (Enka) regenerated cellulose, simplex (melamineformaldehyde coated Dacron) permeate spacer, Vexar feed channel spacer, Nylon 6 end pieces and silicone rubber U-cup seal. GE-116 silicone adhesive (lower viscosity than GE-106) was used as the adhesive for the membrane. DC-734 with a 1.5% solution of Z-6040 in acetone as primer was used to form the outer wrap. The nylon was drilled to form mechanical anchor points (⅛ inch holes at 1 inch intervals around the circumference). Melamineformaldehyde coated Dacron simplex was used in the experiment, even though it was discovered that this simplex deteriorates rapidly in hot NMP, NMP/oil.

The GE-116 silicone was used in combination with 1.5% solution of Z-6040 in acetone as primer for forming membrane edge seal bonds. GE-116 and DC-1200 primer were used to bond the membrane to the steel permeate tube.

In using GE-116 which evolves acetic acid during cure, precaution should be taken to use the adhesive under conditions of adequate ventilation. The adhesive is also moisture sensitive, so humidity must be controlled. High humidity results in very short pot life/gel time for this adhesive.

EXAMPLE 10

To overcome the difficulties associated with silicone adhesives which liberate acetic acid while curing and are also sensitive to humidity, a further series of silicone elastomers and primers was evaluated; single-componet silicones, which evolve alcohols, and two-component condensation and addition silicones were reviewed. The adhesives are listed below and are followed by a list of the primers which were evaluated.

TABLE 5

SINGLE-COMPONENT-ALKOXY RTV SILICONE ADHESIVES

| Adhesive | Description | Viscosity (cs) |
|---|---|---|
| GE-61* | White, pourable liquid | 25,000 |
| GE-162 | White, paste | — |
| DC-738** | White, thixotropic paste | — |
| DC-3140 | Translucent, flowable liquid | 35,000 |
| DC-3145 | Translucent, paste | — |

*General Electric
**Dow Corning

TABLE 6

TWO-COMPONENT RTV SILICONE ADHESIVES

| Adhesive | Description | Viscosity (cps) | Type Cure |
|---|---|---|---|
| GE-11* | White, pourable liquid | 12,000 | Condensation |
| GE-21 | Pink, pourable liquid | 25,000 | Condensation |
| GE-31 | Red, pourable liquid | 30,000 | Condensation |
| GE-60 | Red, pourable liquid | 45,000 | Condensation |
| DC-3110** | White, flowable liquid | 14,000 | Condensation |
| DC-3120 | Red, flowable liquid | 30,000 | Condensation |
| DC-182 | Translucent liquid | 3,900 | Addition |
| DC-184 | Translucent liquid | 3,900 | Addition |
| DC-615 | Translucent liquid | 3,900 | Addition |

*General Electric
**Dow Corning

Some of the silicones listed above were incompatible with DC Z-6040 primer or required special primers as recommended by manufacturers' literature. The primers evaluated are listed below.

TABLE 7
CANDIDATE PRIMERS FOR THE SILICONE EDGE-SEAL ADHESIVE STUDY

| Primer | Solvent | Primer | Solvent System |
|---|---|---|---|
| DC-1200* (clear) (siloxane) | VM & P Naphtha | GE SS-4179 | Proprietary |
| DC-1200 (red) (siloxane) | VM & P Naphtha | DC Z-6020 | Methanol |
| DC-1201 (siloxane) | Acetone-Toluene | DC Z-6030 | Acetone |
| DC-1204 (siloxane) | VM & P Naphtha, Toluene, Butanol, | DC Z-6032 | Methanol |
| DC-1205 (silicone) | Toluene, Ethylcellosolve Acetate, Ethylene Glycol-methylether | DC Z-6040 | Acetone |
| GE-SS-4120** (ethylsilicate) | Ethanol-Methanol | DC Z-6082 | Acetone |
| GE-SS-4004 (polysiloxane) | Butanol, Toluene IPA-Acetone | DC Sylgard | Heptane |
| GE-SS-4044 (polysiloxane) | Butanol, Toluene IPA-Acetone | UC A-143*** | Acetone |
| GE-SS-4155 (ethylorthosilicate titanate) | Mineral Spirits | UC A-180 | Acetone |

*Dow Corning
**General Electric
***Union Carbide

In evaluating the above-identified adhesive/primer coupons of adhesive filled simplex sandwiched between two pieces of PM250 (Enka) regenerated cellulose were employed. The coupons were allowed to cure for 24 hours at room temperature (about 21°–23° C.) and were post cured for 24 hours at 60° C. Testing was done in NMP (120° C.) and NMP/oil (20% 600N oil, 120° C.). A nitrogen atmosphere was maintained over the test solvents to minimize solvent degradation.

Adhesives were tested first for bond formation with unprimed PM250. Only a few silicones formed bonds and these bonds failed in the hot NMP or hot NMP/oil.

All of the adhesives formed bonds to regenerated cellulose when used in conjunction with one or more primer. However, a number of silicones were eliminated from further study for a variety of reasons. Some did not age well in the hot test solvents, while the paste-consistency silicones were too viscous to be useful and the two component addition cure silicones were susceptible to cure inhibition. Those silicones eliminated are listed below.

TABLE 8
ADHESIVES ELIMINATED DURING THE SCREENING PROCESS

| Adhesive | Type | Reason for Elimination |
|---|---|---|
| DC 182 | Clear, two component, addition | Cure inhibition |
| DC 184 | Clear, two component, addition | Cure inhibition |
| DC 738 | White, one component, alkoxy | Poor NMP resistance* |
| DC 3110 | Clear, two component, condensation | ppt on bottom of can |
| DC 3145 | Clear, one component, alkoxy | Undesirable viscosity |
| GE 161 | White, one component, alkoxy | Poor NMP resistance |
| GE 162 | White, one component, alkoxy | Undesirable viscosity |
| GE 11 | White, two component, condensation | ppt on bottom of can |
| GE 615 | Clear, two component, addition | Cure inhibition |

*Adhesive became "cheesy" after 5 weeks in NMP at 120° C.

Those silicone adhesives which were further evaluated are listed below.

TABLE 9
CANDIDATE EDGE-SEAL ADHESIVES

| Adhesive | Type | Viscosity (cps) |
|---|---|---|
| DC 3120 | Red two component, condensation | 30,000 |
| DC 3140 | Clear, one component alkoxy | 35,000 |
| GE 21 | Pink, two component condensation | 25,000 |
| GE 31 | Red, two component, condensation | 30,000 |
| GE 60 | Red, two component, condensation | 45,000 |

Of these 5 candidates GE-21 was eliminated because its physical properties were more effected by the solvents than were those of the more promising candidates. GE-60, while a good performer, has a very high viscosity which made it difficult to work with. DC 3120 was eliminated because it did not cure well.

EXAMPLE 11

GE-31 and DC-3140 were then evaluated in edge-seal coupons in conjunction with the previously listed primers (Example 10). GE RTV 9811 paste catalyst (1 part) was used with the GE-31 adhesive (10 parts).

The primers which were selected were those which had been found to give NMP-resistant bonds with these adhesives. Evaluation of the bonded coupons in NMP and NMP-oil at 120° C. was carried out for 10-12 months at which time testing was terminated because the PM 250 regenerated cellulose became very fragile. The adhesive and their primers are listed below:

TABLE 10
GE-31 and DC-3140 EDGE-SEAL COUPON AGING TESTS

| Adhesive | Primer | No. of Test Specimens | Months* @ 120° C. |
|---|---|---|---|
| GE-31 | DC-1200 (red) | 2 | 12 |
|  | GE SS-4004 | 2 | 12 |
|  | GE SS-4155 | 2 | 12 |
| GE-31 | GE SS-4044 | 10 | 12 |
|  | GE SS-4155 | 12 | 12 |
| GE-31 | DC-1200 (red) | 12 | 12 |
| DC-3140 | 1.5% DC Z-6040 in Acetone | 32 | 12 |
| DC 3140 | 1.5% DC Z-6040 in Methanol | 28 | 10 |
|  | GE SS-4120 | 16 | 10 |

*Months in NMP and NMP/oil at 120° C. Coupons were divided equally between NMP and NMP/oil.

The DC-3140 became gelatinous when openly exposed to NMP/oil at 120° C. (example 12) but remained unaffected when tested on edge seal coupons. The adhesive bond of the DC-3140 in the edge-seal coupons remained intact. GE-31 was unaffected by the test solvent. It remained strongly bonded.

In general, silicones fall into three categories in regard to NMP resistance. These categories are based on the color of the adhesive rather than the fact that they are single component or two component adhesives. When the silicones are exposed to NMP-oil at 120° C. (open exposure) the "white" silicone becomes cheesy in about 5 weeks, the clear (or translucent) silicone becomes gelatinous in about 5–6 months, and the red silicones are virtually unaffected even after about 12 months in the hot solvent.

Since the white and the clear silicones deteriorate in NMP at 120° C. the red silicones clearly are preferred for fabricating membrane elements for use in NMP-oil separation processes. Of the red silicones, GE-31 is preferred for this purpose.

EXAMPLE 12

Spiral-wound elements employ central permeate tubes to carry off the permeate product. NMP resistant bonds must be formed between the membrane permeate spacer material and this central tube. In this example, the bonding of GE-31 and DC-3140 to a carbon-steel permeate tube was evaluated in conjunction with the previously listed 18 primers (Example 10). The carbon steel tube was prepared by sandblasting, rinsing in acetone, and drying. The primer was applied to the tube, allowed to dry, then followed by a 1/16 inch thick coating of adhesive. Curing was for 24 hours at room temperature followed by another 24 hours at 60° C. The test specimens were then immersed in hot NMP/oil (120° C.).

For the DC-3140 adhesive, six primers promoted a strong bond between the membrane and the tube. They are DC-1200 (clear), DC-1200 (red), DC Sylgard, GE SS-4004, GE SS-4044 and GE SS-4155. After 5-6 months in NMP/oil at 120° C. the adhesive became gelatinous and the test was discontinued.

For the GE-31 adhesive (10 parts) with GE-9811 catalyst (1 part), five primers promoted a strong bond between the membrane and the permeate tube. They are GE SS-4044, GE SS-4155, GE SS-4004, DC-1200 (clear), and DC-1200 (red). The bonds remained strong after 8-9 months in NMP/oil at 120° C.

EXAMPLE 13

GE-31 (10 parts) with GE-9811 (1 part) was evaluated for bonding to specimens of Nylon 6 end-piece material. It did not bond to the unprimed nylon. Primers which were found effective in bonding GE-31 to PM 250 regenerated cellulose were evaluated for bonding the adhesive to nylon. Only GE SS-4044 promoted an NMP-oil resistant bond between the nylon and adhesive. The bond was still good after 13 months in NMP-oil at 120° C.

EXAMPLE 14

Four-inch diameter spiral wound elements were fabricated using PM 100 (Enka) regenerated cellulose, carbon steel permeate tube, Simplex style 139 permeate spacer (melamine formaldehyde impregnated Dacron) and Vexar No. 530-V-400 feed spacer. DC-3140 was used as the edge seal adhesive. GE SS-4120 primer was used to prime the membrane, and GE SS-4044 was used to prime the carbon steel permeate tube. The elements were tested under a vacuum of 750-760 mm Hg applied to the permeate side of the element. The elements were then sealed and if the vacuum fell below 500 mm Hg in 10 minutes the element was considered unsuitable. Four of 5 elements fabricated failed. The fifth which passed was given an outer wrap of GE-31. It failed on start-up of NMP/oil separation process. Element failures were attributed to edge seal leakage due to poor bonding resulting from membrane wrinkling during winding. Some leakage also occurred because of pinholes in the membrane.

Wrinkling was minimized in future winding by assuring that the regenerated cellulose membrane had minimal exposure to humidity (which causes wrinkling) and by taking care to avoid wrinkling during the winding process. Pinholes caused by foreign matter particles on the spacer materials and by particles generated during cutting and preparation were avoided by careful inspection of the spacer materials to remove projecting particles.

EXAMPLE 15

The next set of four inch diameter elements fabricated from Enka PM100 regenerated cellulose employed GE-31 (10 parts) GE-9811 catalyst (1 part). GE SS-4044 was the primer. Two elements passed and two failed the vacuum tests (described above). Failures were attributable to edge-seal failure.

EXAMPLE 16

Three more four inch diameter PM100 membrane elements were fabricated. Hornwood Style 8415 simplex was employed as permeate spacer material. GE-31 and GE-9811 catalyst (10/1) and GE SS-4044 was the adhesive-primer system. All elements failed when evaluated for the separation of NMP from oil. Failures were attributable to poor edge seals, shattered membrane and membrane edge-seal wrinkling.

EXAMPLE 17

A four inch diameter element was fabricated using PM 250 (Enka) regenerated cellulose, Vexar Style 530-V-0400 feed spacer, Hornwood Style 8415 permeate spacer, carbon steel permeate tube and GE 31 with GE 9811 catalyst (10/1) and GE SS-4044 primer adhesive system. After fabrication the element was allowed to cure over the weekend, then disassembled and examined. It was seen that large sections of edge seal were unbonded and bonded areas had spotty adhesion, the adhesive failing to penetrate the spacer material through to the membrane. There was evidence that the viscosity of the adhesive had become too high to allow good bond formaties during the winding of the element. Primer wet-out of the membrane was poor.

To overcome these problems the pot life of the adhesive was lengthened by reducing the amount of catalyst used. Adhesive to catalyst ratio was increased from 10/1 to 19/1.

To improve primer wetting of the spacer-membrane a series of diluents was tested. It had been observed that the primer had a tendency to form puddles on the primed surface resulting in a lack of uniformity, directly contributing to bond failure. The diluents tested for GE SS-4044 primer in an attempt to improve the primer's wetting powers are listed below, along with the observed results. Rhodamine B was used as a dye stain to facilitate observation. The diluted primer was wiped on to PM250.

TABLE 11

| EFFECT OF VARIOUS DILUENTS ON THE WETTING OF PM 250 BY GE SS4044 PRIMER ||
|---|---|
| Diluent:Primer | |
| Control (none) | Forms puddles |
| Acet:4044 = 3:1 | Forms puddles |
| Acet:4044 = 7:1 | Forms puddles |
| Acet:IPA:4044 = 3:3:2 | Some improvement, still poor |
| Acet:MeO:4044 = 3:3:2 | Poor coverage, puddles |
| MeOH:4044 = 3:1 | Formed puddles, caused wrinkling |
| MeOH:4044 = 3:1 | Formed puddles, caused wrinkling |
| Acet:IPA:4044 = 1:2:1 | Formed puddles |
| MEK:4044 = 3:1 | Worse than acetone |
| IPA:4044 = 3:1 | Excellent uniform coverage |

TABLE 11-continued
EFFECT OF VARIOUS DILUENTS ON THE WETTING OF PM 250 BY GE SS4044 PRIMER

| Diluent:Primer | |
|---|---|
| IPA:MeO:4044 = 2:1:1 | Forms puddles |

Acet = acetone,
MEK = methyl ethyl ketone,
IPA = isopropanol,
MeOH = methanol.
044 = GE SS-4044 primer.

Ge SS-4044 is marketed as a solution of a proprietary primer in isopropanol: acetone (50:50). As is seen, diluting GE SS-4044 with additional volumes of IPA/acetone or acetone did not significantly improve primer performance. Only dilution with isopropanol improved primer wet-out of the regenerated cellulose membrane.

A test coupon of PM250 and Hornwood 8415 permeate spacer was prepared using a dye containing solutions of GE SS 4044 in three parts IPA. The spacer material was dipped in primer and allowed to dry. The regenerated cellulose membrane was wiped with primer using a paper towel. GE-31 (19 parts) was mixed with Ge-9811 paste catalyst (1 part) and applied to the membrane-spacer-membrane sandwich. After curing overnight the adhesive was strongly bonded. Penetration of the adhesive through the spacer was excellent.

EXAMPLE 18

Nine 4-inch diameter elements were constructed. Eight elements used PM250 and one employed PM 100. All elements employed Hornwood Style 8415 permeate spacer, Vexar Style 5305-040-07-0700 feed spacer, carbon steel permeate tube (¾ inch ID, 26 inch length), nylon end pieces, GE-31/GE-9811 (19/1) adhesive system and 25 volume percent solution of GE SS-4044 in IPA as primer. The eight elements using PM 250 passed the vacuum test, but the elements using PM 100 failed the vacuum test. All elements, however, appeared to possess good edge seal bonds on visual inspection.

One of the elements has performed for over 6 weeks in the test separation of NMP from oil.

EXAMPLE 19

An eight-inch diameter spiral-wound PM 250 membrane was fabricated using GE-31 with 0.10 weight percent dibutyl tin dilaurate (DBT) liquid catalyst. The liquid catalyst gave an adhesive pot life of up to two hours. This was required since eight-inch diameter elements require a longer assembly time than four-inch diameter elements, and the longer pot life could not be achieved using GE RTV 9811 paste catalyst. The materials of construction for the eight-inch diameter element are as follows:

TABLE 12

| | |
|---|---|
| Membrane: | Cuprophan PM 250, lot No. 81-2485-10 (Enka) |
| Permeate Spacer: | Hornwood experimental simplex, Style 8415 |
| Feed Spacer: | Amoco Vexar, Style 5305-040-07-0070 |
| U-Cup Carrier: | Machined from Nylon 6 |
| U-Cup Seal: | Formed from red RTV silicone |
| Antitelescoping Device: | Machined from Nylon 6 |
| Permeate Tube: | Carbon steel tubing, 42-in. long, 1.25-in OD |
| Edge-Seal Adhesive: | GE-31 + Dibutyl Tin Dilaurate catalyst (0.10 wt. %) |
| Outer-Wrap Adhesive | Same as edge-seal |
| Outer-Wrap Tape: | Three-inch wide woven-glass tape |
| Primer System: | GE SS-4044, 25 volume percent in IPA (2-4 days Rhodamin B dye) (10% in Methanol) |

Approximately two hours were required for the winding of the element. The viscosity of the adhesive stayed within a good working range during that period.

The element was inspected the following day. The element passed the vacuum test and the edge-seal bonds were excellent.

EXAMPLE 20

The bonding of GE-31 to aluminum was evaluated. GE-31 with 0.10 weight percent DBT catalyst was applied to unprimed aluminum. It did not bond. The following primers were then evaluated to determine if they would promote a bond between aluminum and the adhesive:

TABLE 13

| | |
|---|---|
| GE SS-4044 | DC Z-6040 |
| GE SS-4120 | DC Z-6032 |
| GE SS-4155 | DC Z-6020 |
| GE SS-4179 | DC Z-6040 |
| UC A-143 | DC Z-6075 |
| UC A-186 | DC Z-6082 |

Of the above series, only GE SS-4044 and GE SS-4155 promoted a strong bond between the GE-31 adhesive and the aluminum. These were still strongly bonded after two weeks in NMP/oil at 120° C.

EXAMPLE 21

Two four-inch diameter spiral-wound PM 250 membrane elements were fabricated employing aluminum end-pieces instead of Nylon 6. The adhesive/primer system employed was GE-31 with 0.10 weight percent DBT catalyst. GE SS-4044 was used to prime the aluminum end-pieces, and a 25% solution of GE SS-4044 in isopropanol was used to prime other components for bonding to the adhesive. Both elements had excellent vacuum test values.

What is claimed is:

1. A method for producing an element using an adhesive/primer system for use in the recovery of extraction solvents from extract and raffinate streams produced in extraction processes, wherein the extraction solvent recovery is effected using regenerated cellulose membranes and wherein the element comprises a permeate product tube, membrane layers, permeate spacer layers, feed spacer layers and end pieces and anti-telescoping device arranged in a spiral wound element configuration, the adhesive system used to form the membrane edge seals consisting of a red two component condensation silicone in combination with a compatible catalyst wherein the surfaces are primed with a siloxane or ethylortho silicate titanate primer; a clear, single component alkoxy RTV silicone wherein the surfaces are primed with an epoxy silane, ethylortho silicate titanate or ethylsilicate primer; and red or clear single component acetoxy RTV silicone in combination with an epoxy silane primer.

2. A method for producing an element using an adhesive/primer system for use in the recovery of extraction solvent from extract and raffinate streams produced in extraction processes, wherein the extraction solvent recovery is effected using regenerated cellulose membranes and wherein the element comprises a permeate product tube, membrane layers, permeate spacer layers, feed space layers and end pieces anti-telescoping devices arranged in a spiral wound element configuration, the adhesive system used to bond the membrane leaves to the steel permeate product tube consisting of a clear, single component alkoxy RTV silicone wherein the surfaces are primed with an epoxysilane or ethylorotho silicate titanate primer, a red two component condensation silicone in combination with a compatible catalyst wherein the surfaces are primed with a siloxane or ethylortho silicate titanate primer.

3. The method of claim 1 wherein the extraction solvent is NMP.

4. The method of claim 2 wherein the extraction solvent is NMP.

5. A method for producing an element using an adhesive/primer system for use in the recovery of extraction solvents from extract and raffinate streams produced in extraction processes, wherein the extraction solvent recovery is effected using a selective membrane and wherein the element comprises a permeate product tube, membrane layers, permeated spacer layers, feed space layers and end pieces and anti-telescoping device arranged in a spiral wound element configuration, the adhesive system used to bond the nylon pieces and forming an outer wrap consisting of red condensation silicone in combination with a catalyst wherein the surfaces are primed using a polysiloxane primer and wherein the primer is permitted to dry prior to the application of the adhesive.

6. A method for producing an element using an adhesive/primer system for use in the recovery of extraction solvent from extract and raffinate streams produced in extraction processes, wherein the extraction solvent recovery is effected using a selective membrane and wherein the element comprises a permeate product tube, membrane layers, permeate spacer layers, feed spacer layers and end pieces and anti-telescoping device arranged in a spiral wound element configuration, the adhesive system used to bond the aluminum end pieces and forming an outer wrap consisting of a red condensation silicone polysiloxane in combination with a compatible catalyst wherein the surfaces are primed using a siloxane or ethylortho silicate titanate primer and wherein the primer is permitted to dry prior to the application of the adhesive.

7. A method for producing an element using an adhesive/primer system for the recovery of extraction solvent from streams produced in extracting processes, wherein the extraction solvent recovery is effected using a selective membrane, the adhesive system used to form any membrane to membrane adhesive bonds in the element consisting of a red, two component condensation silicone in combination with a compatible catalyst wherein the surfaces are primed with a siloxane orethylortho siliate titanate; or a clear, single component alkoxy RTV silicone wherein the surfaces are primed with an epoxy silane, ethylortho silicate titanate or ethyl silicate primer, or a clear or red acetoxy silicone in combination with an epoxy silane primer.

8. A method for producing an element using an adhesive/primer system for the recovery of extraction solvent from streams produced in solvent extraction processes, wherein the extraction solvent recovery is effected using a selective membrane, the adhesive system used to form any membrane to metal adhesive bonds in the element is a clear, single component alkoxy RTV silicone wherein the surfaces are primed with a siloxane or ethylortho silicate titanate primer; a red two component condensation silicone GE-31 in combination with a compatible catalyst wherein the surfaces are primed with a siloxane or ethylortho silicate titanate primer.

9. The method of claim 1 for producing an element using an adhesive/primer system for use in the recovery of extraction solvents from extract and raffinate streams produced in extraction processes, wherein the extraction solvent recovery is effected using regenerated cellulose membranes and wherein the element comprises a permeate product tube, membrane layers, permeate spacer layers, feed spacer layers and end pieces and anti-telescoping device arranged in a spiral wound element configuration, wherein the red two component condensation silicone adhesive is GE-31 RTV silicone in combination with GE RTV 9811 catalyst and wherein the primer is selected from GE SE-4044, GE SS-4155, GE SS-4004, and DC-1200 (red); GE-31 RTV silicone in combination with dibutyl tin dilaurate catalyst wherein the primer is GE SS-4044 primer; wherein the single component alkoxy RTV silicone and the primer are selected from Z-6040 in acetone, Z-6040 in methanol, and GE SS-4120; and wherein the single component acetoxy RTV silicone is GE-106, GE-116 or GE-108 and the primer is Z-6040.

10. The method of claim 2 for use in producing an element using an adhesive/primer system for use in the recovery of extraction solvent from extract and raffinate streams produced in extraction processes, wherein the extraction solvent recovery is effected using regenerated cellulose membranes and wherein the element comprises a permeate product tube, membrane layers, permeate space layers, feed spacer layers and end pieces and antitelescoping device arranged in a spiral wound element configuration, the adhesive system used to bond the membrane leaves to the steel permeate product tube wherein the clear single component alkoxy RTV silicone is DC-3140 and wherein the primer is DC-1200 (clear), DC-1200 (red), DC Sylgard, GE SS-4004, GE SS-4044, or GE SS-4155; wherein the red two component condensation silicone is GE-31 in combination with GE-9811 catalyst wherein the primer is GE SS-4044, GE SS-4155, GE SS-4004, DC-1200 (clear) or DC-1200 (red), and wherein the red two component condensation silicone is GE-31 in combination with dibutyl tin dilaurate catalyst and wherein the primer is GE SS-4044 primer.

11. The adhesive/primer system of claim 9, wherein the extraction solvent is NMP.

12. The adhesive/primer system of claim 10 wherein the extraction solvent is NMP.

13. The method of claim 9, 10, 11, 12, 1, 2, 3 or 4 wherein the primer is permitted to dry on the primed surface prior to application of the adhesive.

14. The method of claim 9, 10, 11, 12, 1, 2, 3 or 4 wherein the adhesive consists of GE-31 RTV silicone in combination with GE RTV 9811 catalyst and wherein the surfaces are primed with GE SS-4044 primer.

15. The adhesive/primer system of claim 14 wherein the silicone and catalyst are used in a ratio of 19/1 and wherein the primer is a solution of primer diluted with isopropanol.

16. The adhesive/primer of claim 15 wherein the primer isopropyl alcohol dilution ratio is up to 4 to 1.

17. The adhesive/primer system of claim 16 wherein the primer isopropyl alcohol dilution ratio is 3 to 1.

18. The method of claim 9, 10, 11, 12, 2, 3 or 4 wherein the silicone and catalyst are GE-31 RTV silicone in combination with dibutyl tin dilaurate catalyst wherein the surfaces are primed with GE SS-4044 primer.

19. The adhesive/primer system of claim 18 wherein at least 0.10 wt% catalyst based on total catalyst/silicone is used with the silicone and wherein the primer is a solution of primer diluted with isopropanol.

20. The method of claim 5 for producing an element using an adhesive/primer system for use in the recovery of extraction solvents from extract and raffinate streams produced in extraction processes, wherein the extraction solvent recovery is effected using membranes and wherein the element comprises a permeate product tube, membrane layers, permeate spacer layers, feed spacer layers and end pieces and anti-telescoping device arranged in a spiral wound element configuration, wherein the red two components condensation silicione adhesive is GE-31 in combination with GE-9811 catalyst and wherein the primer is GE SS-4044 and wherein the primer is permitted to dry prior to the application of the adhesive.

21. The method of claim 6 for producing an element using an adhesive/primer system for use in the recovery of extraction solvent from extract and raffinate streams produced in extraction processes, wherein the extraction solvent recovery is effected using membranes and wherein the element comprises a permeate product tube, membrane layers, permeate spacer layers, feed spacer layers and end pieces and anti-telescoping device arranged in a spiral wound element configuration, wherein the red two component condensation silicone adhesive is GE-31 in combination with GE-9811 catalyst and wherein the primer is GE SS-4044 or GE SS-4155 and wherein the primer is permitted to dry prior to the application of the adhesive.

22. The method claim 20, 21, 5 or 6 wherein the extraction solvent is NMP.

23. The method of claim 7 for producing an element using an adhesive/primer system for the recovery of extraction solvent from streams produced in extracted processes, wherein the extraction solvent recovery is effected using a selective membrane, wherein the red two component condensation silicione adhesive is GE-31 RTV silicone in combination with GE-RTV-9811 and wherein the primer is GE SS-4044, GE SS-4155, GE SS-4004, and DC 1200 (red); GE 31 RTV silicone in combination with dibutyl tin dilaurate wherein the clear primer is GE SS-4044 primer; wherein the single component alkoxy RTV silicone is DC-3140 and wherein the primer is Z-6040 in acetone, Z-6040 in methanol, GE SS-4120; and wherein the clear or red single component acetoxy RTV silicone is GE-106, GE-116 or GE-108 and the primer is Z-6040.

24. The method of claim 8 for producing an element using an adhesive/primer system for the recovery of extraction solvent from streams produced in solvent extraction processes, wherein the extraction solvent recovery is effected using a selective membrane, wherein the clear single component alkoxy RTV silicone adhesive is DC-3140 and wherein the primer is DC-1200 (clear), DC-1200 (red), DC Sylgard, GE SS-4044, GE SS-4004, and GE SS-4155; wherein the red, two component condensation silicone is GE-31 in combination with GE-981 catalyst and wherein the primer is GE SS-4044, GE SS-4155, GE SS-4004, DC-1200 (clear), or DC-1200 (red); and GE-31 in combination with dibutyl tin dilaurate wherein the primer is GE SS-4044 primer.

25. The method of claim 23 or 7 wherein the extraction solvent is NMP.

26. The method of claim 24 or 8 wherein the extraction solvent is NMP.

27. The method of claim 23, 24, 7 or 8 wherein the primer is permitted to dry on the primed surface prior to application of the adhesive.

28. The method of claim 23, 24, 7 or 8 wherein the adhesive consists of GE-31 RTV silicone in combination with GE RTV 9811 catalyst and wherein the primer is GE SS-4044.

29. The adhesive/primer system of claim 28 wherein the silicone and catalyst are used in a ratio of 19/1 and wherein the primer is a solution of the primer diluted with isopropanol.

30. The adhesive/primer system of claim 29 wherein the primer to isopropanol dilution ratio is up to 4 to 1.

31. The method of claim 23, 24, 7 or 8 wherein the silicone and catalyst are GE-31 RTV silicone in combination with dibutyl tin dilaurate catalyst and the primer is GE SS-4044.

32. The adhesive/primer system of claim 31 wherein at least 0.10 wt% catalyst based on total silicone and catalyst is used with the silicone.

33. The adhesive/primer system of claim 32 wherein the primer is diluted with isopropanol at a dilution ratio up to 4 to 1.

* * * * *